United States Patent

[11] 3,594,908

| [72] | Inventor | Elio Pagella<br>Ivrea, Italy |
|---|---|---|
| [21] | Appl. No. | 757,958 |
| [22] | Filed | Sept. 6, 1968 |
| [45] | Patented | July 27, 1971 |
| [73] | Assignee | Ing. C. Olivetti & C., S.p.A.<br>Ivrea (Turin), Italy |
| [32] | Priority | Sept. 14, 1967 |
| [33] | | Italy |
| [31] | | 53018A/67 |

[54] PRECISION MEASURING MACHINE
8 Claims, 3 Drawing Figs.

[52] U.S. Cl.......................................... 33/174 L,
33/147 E, 33/170, 33/174 L
[51] Int. Cl............................................. B23q 17/00,
B23q 17/18
[50] Field of Search........................................... 33/147 E,
170, 172, 174 H, 174 L, 174 P, 174 TA

[56] References Cited
UNITED STATES PATENTS

| 1,908,276 | 5/1933 | Aldeborgh.................. | 33/174 E |
| 2,844,878 | 7/1958 | Zwierzynski ................ | 33/170 |
| 3,136,069 | 6/1964 | Reason....................... | 33/174 L |
| 3,403,448 | 10/1968 | Aller............................ | 33/174 L |

Primary Examiner—Leonard Forman
Assistant Examiner—Paul G. Foldes
Attorney—Irons, Birch, Swindler and McKie ABSTRACT: A machine for conducting precision measuring operations. The machine comprises an article-supporting work table and a sensor element moveable into contact with an article on the table. The sensor is moveable along three mutually perpendicular axes and the table is shiftable toward and away from the sensor to increase the flexibility and overall capacity of the machine.

PRECISION MEASURING MACHINE

CROSS-REFERENCE TO RELATED APPLICATION

Applicant claims priority from corresponding Italian patent application Ser. No. 53018-A/67, filed Sept. 14, 1967.

BACKGROUND OF THE INVENTION

1. Field of the Invention

This invention relates to a coordinate measuring machine of the type used for quality control (i.e., checking levels and dimensions) of mechanical parts, marking such parts, and generally in the performance of precision checking and measuring operations. More particularly the invention relates to precision measuring machines of the type which comprise a horizontal worktable and a vertically shiftable sensor element mounted above the table.

2. Description of the Prior Art

Precision measuring machines are preferably designed to accommodate articles, such as machine parts, of widely differing size. In the past, these machines have been constructed with a space between the worktable and the sensing element which is large enough to accommodate parts of large size. Then, in order to operate on parts of smaller size, gauge blocks are placed beneath the part being measured, whereby the part is positioned within the range of action of the sensing element. Thus, known machines are complicated in operation and subject to errors.

SUMMARY OF THE INVENTION

The problems discussed above, are avoided to a significant degree, through the use of a machine which embodies the concepts and principles of the instant invention for conducting precision measuring operations on an article. This machine comprises a frame and an article-contacting sensor element carried by the frame. The sensor element is reciprocably moveable relative to the frame along a substantially rectilinear path of travel. The machine also includes a worktable having a generally planar article support surface. Guide means are provided for mounting the worktable on the frame for rectilinear movement in general parallelism with the path of travel of the element. The table is disposed with the surface facing the element and generally perpendicular to the path of travel of the element.

DESCRIPTION OF THE PREFERRED EMBODIMENT

Figure 1:
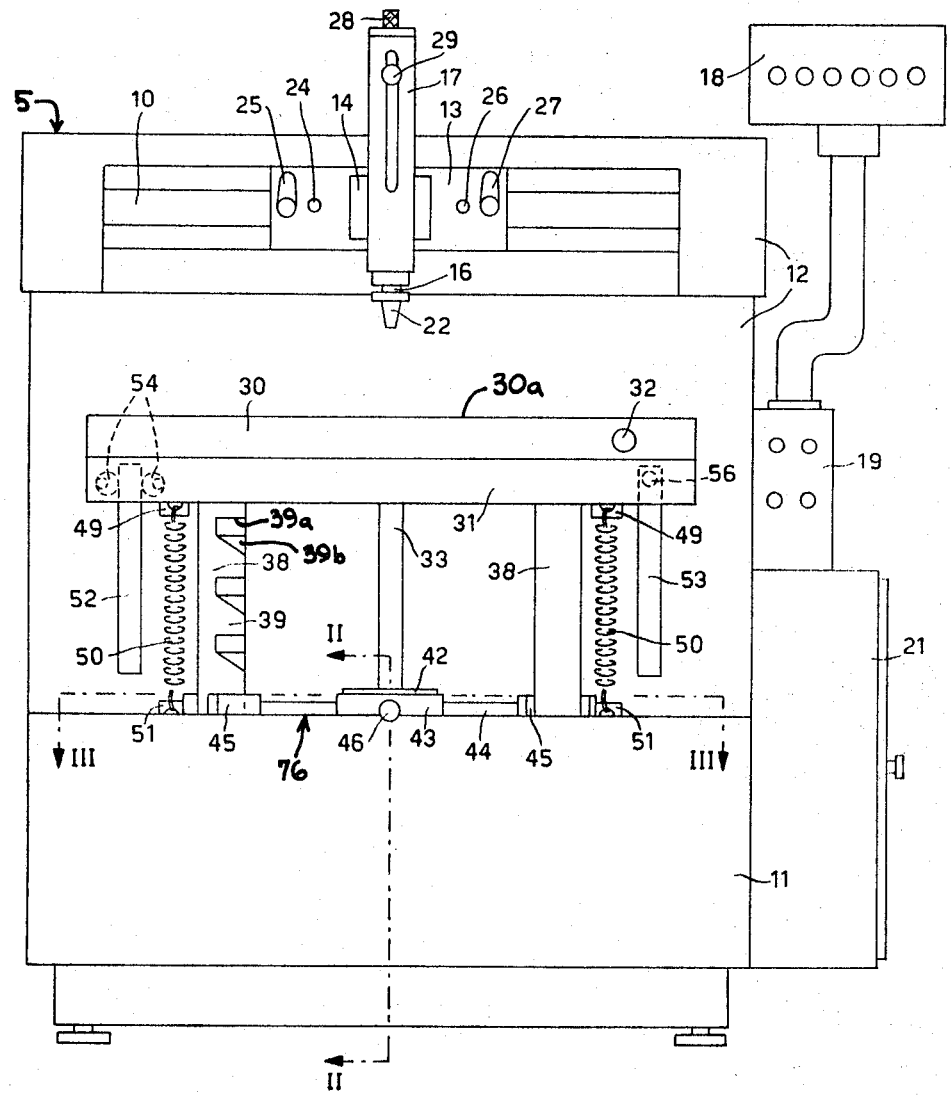
FIG. 1 is a front elevational view of a precision measuring machine which embodies the concepts and principles of the instant invention.

A machine for conducting precision measuring operations and which embodies the principles and concepts of the instant invention is designated broadly, in the drawings, by the numeral 5. Referring to FIG. 1, machine 5 includes a frame in the nature of a bed 11, a carriage 13 rectilinearly slidable transversely on a guide 10 carried by a mounting 12 fixed to bed 11, an outwardly projecting structure in the nature of a bar 14 slidable longitudinally in carriage 13, and a rod 16 mounted within a protecting member 17 disposed at the outer end of bar 14. Rod 16 is reciprocably slidable along a vertical, rectilinear path of travel within member 17. Thus, carriage 13 is moveable on bed 11 in a direction generally perpendicular to the path of travel of rod 16 in member 17, and bar 14 is extensible and retractible in a direction generally perpendicular to such path of travel as well as to the direction of movement of carriage 13 on bed 11. Hence, rod 16 is moveable relative to bed 11 in three mutually perpendicular directions.

To bed 11 are also fixed a display 18 for the reading of data read, a control panel 19 and a hydraulic supply system 21 for oil under pressure. To the lower end of rod 16 is fixed an article contacting sensor element, for example a probe tip 22, which is interchangeable with other measuring and sensing tips (not shown) for increased flexibility of operation.

Figure 2:
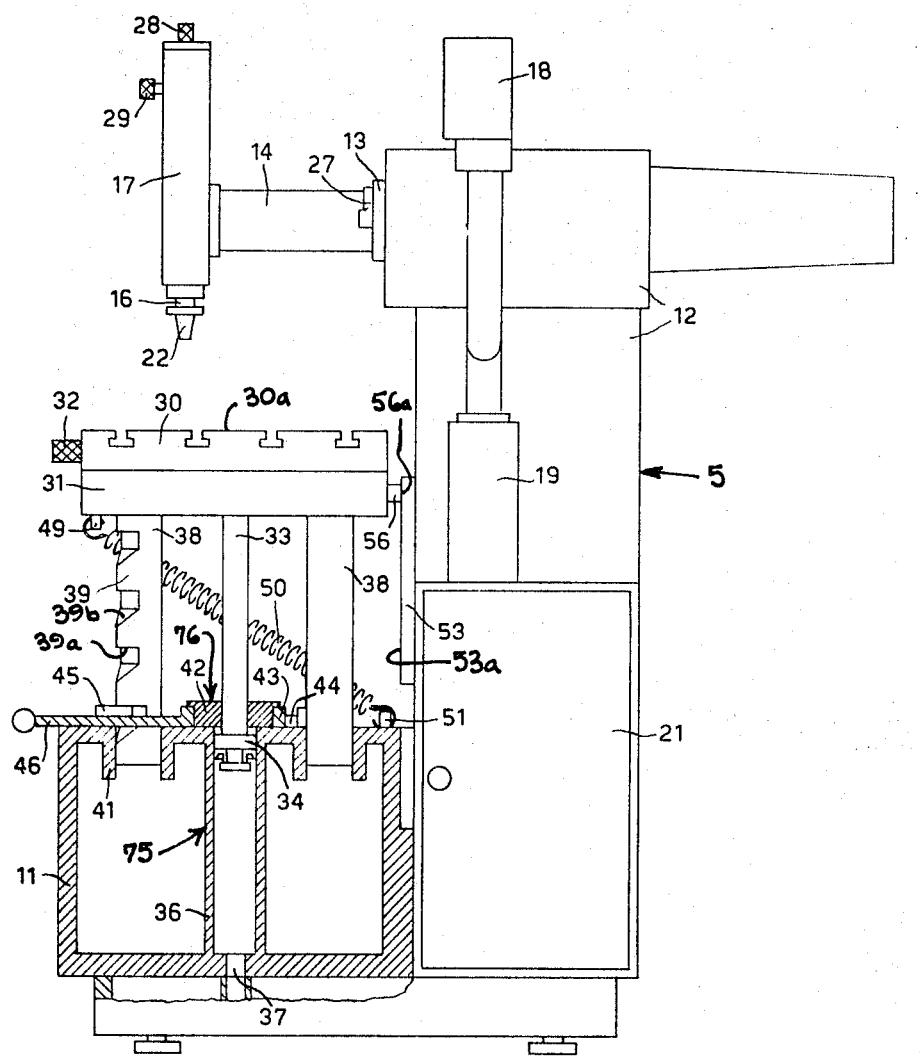
FIG. 2 is a side elevational view of the machine, the lower portion thereof being a cross-sectional view taken substantially along line II—II of FIG. 1.

Carriage 13 is provided with a screw 24 for micrometric adjustment of its movements, and with a locking lever 25. On carriage 13 are also located a screw 26 for the micrometric adjustment of the movements of bar 14, and an associated locking lever 27. On protecting member 17 are located a screw 28 for the micrometric adjustment of the movements of rod 16, and a screw 29 for locking rod 16 (FIG. 2). Adjustment of the screws controls indicator 18 in known manner.

Machine 5 also comprises a worktable 30 resting on a flat rectangular plate 31. Table 30 is pivoted for limited rotation about a vertical axis on a central pin (not shown) fixed to plate 31. A screw 32 is adapted to control the rotation of table 30. Thus, it can be seen that table 30 has a generally planar surface 30a which is adapted for supporting an article being measured. Surface 30a faces upwardly toward rod 16 (and tip 22) and is generally perpendicular to the path of travel of rod 16 within member 17.

The lower part of plate 31 is fixed to a piston rod 33 integral with a piston 34 slidable vertically in a single acting oil cylinder 36. Cylinder 36 is integral with bed 11, so that table 30 is moveable vertically on bed 11. Cylinder 36 is connected to the supply system 21 via a port 37. Thus, piston rod 33, piston 34 and cylinder 36 present a piston and cylinder assembly 75 which serves as prime mover means for raising and lowering table 30. Manifestly, assembly 75 is disposed for rectilinear extension and contraction in parallelism with the path of travel of rod 16 within member 17.

At the upper end of cylinder 36 is fixed a flanged collar 42. Between collar 42 and the horizontal upper face of bed 11 is mounted a shiftable spider 76 comprising a ring 43 on which are fixed four spider arms 44 which extend radially outwardly from ring 43 substantially along the diagonals of plate 31 (shown in dot-dash lines in FIG. 3). To the end of each arm 44 is fixed a block element 45, each element 45 being adapted to cooperate with a series of teeth 39 provided in a respective one of the four elongated vertical pillars 38.

Pillars 38 are disposed in substantial parallelism to the path of travel of rod 16 in member 17 and are substantially equidistant from assembly 75. Pillars 38 are also fixed at their upper ends to plate 31. The lower ends of pillars 38 are slidably received with some clearance within respective guide channels or sleeves 41 formed integrally with bed 11. Thus, pillars 38 are guided for vertical movement by sleeves 41.

Teeth 39 are formed by milling the respective pillar 38 and are disposed at distances equal to the zone of action of probe tip 22. The lower flank 39a of each tooth 39 is perpendicular to its pillar 38, whereas the upper flank 39b is inclined.

A lever 46 is fixed on ring 43. A tension spring 47 interconnects lever 46 and a pin 48 fixed on bed 11 (FIG. 3) to urge spider 76 in a clockwise direction. Arms 44 are of substantially the same length so that block elements 45 will simultaneously be engaged with corresponding teeth 39. Thus, spider 76 and teeth 39 present stop means for maintaining pillars 38 and thereby table 30 in any one of a number of predetermined positions.

To plate 31 are fixed two eye members 49 (FIGS. 1 and 2). One end of a respective spring 50 is attached to each member 49. The other ends of springs 50 being connected to corresponding eye members 51 fixed on bed 11. Springs 50 urge plate 31 continuously toward two guide members 52 and 53 integral with mounting 12. Plate 31 is also provided with an abutment shoe member 56 slidable on guide 53 and with two eccentrically pivoted bearings 54 which are slidable on guide 52. Bearings 54 are adjustable for insuring the verticality to the longitudinal plane of the movements of plate 31. Shoe member 56 and guide member 53 have respective slide surfaces 56a and 53a which are substantially parallel to the path of travel of rod 16 in member 17. Surface 53a is vertically elongated and surfaces 56a and 53a are urged into engagement with one another by the action of springs 50. Pillars 38 and their sleeves 41, guides 52 and 53, bearings 54, shoe 56 and springs 50 present guide means mounting table 30 on bed 11 for rectilinear movement in general parallelism with the path of travel of rod 16 within member 17.

Figure 3:
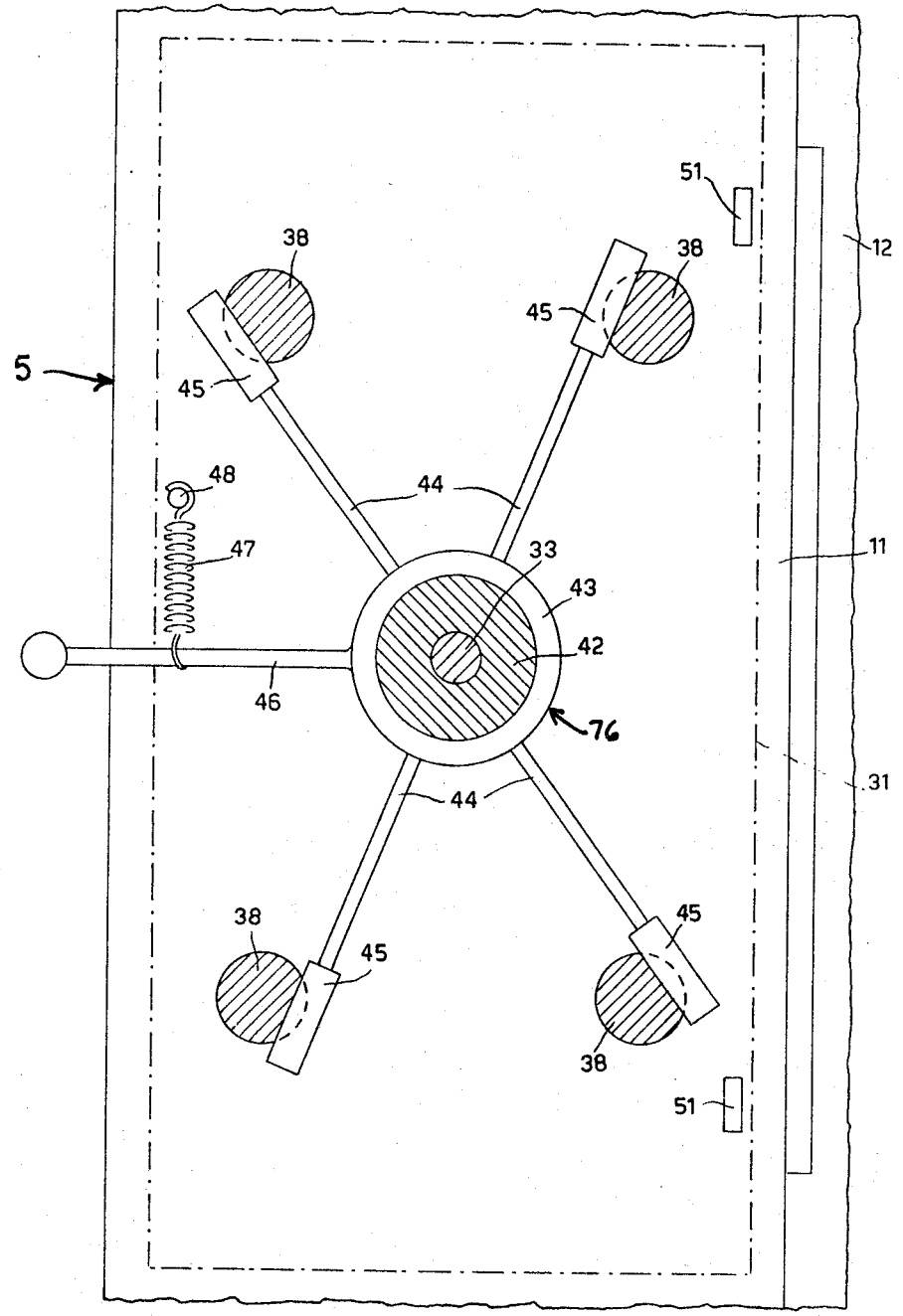
FIG. 3 is an enlarged cross-sectional view taken substantially along line III—III of FIG. 1.

The operation of the machine is as follows:

Spring 47 normally pulls lever 46 into the position shown in FIG. 3, so that ring 43 is urged in a clockwise direction and block elements 45 are engaged with corresponding teeth 39 of respective pillars 38. If a dimensional check is to be made of a dimension included within the normal zone of action of probe 22, table 30 is kept in its present position and screws 24, 26, and 28 are operated so as to bring probe 22 into precision measuring contact with the part. To the value read on the display 18 is then added a constant equal to a multiple of the range of action of probe 22 corresponding to the vertical position of table 30, that is to the tooth 39 engaged by the block element 45 in each pillar 38.

When, in contrast, it is desired to make a reading on a smaller part, assembly 75 is actuated to cause table 30 to rise so as to bring it to a position such that the dimension to be read enters the zone of action of probe 22. For this purpose the admission of oil under pressure to cylinder 36, beneath piston 34, is controlled by means of supply system 21. Through the intermediary of piston rod 33, piston 34 causes plate 31 to move upwardly together with pillars 38 and table 30. Block elements 45 are cammed radially of pillars 38 by the inclined flanks 39b of the respective teeth 39 on which they ride to permit such movement of pillars 38.

When table 30 reaches a position such that the dimension to be measured enters the zone of action of probe 22, the admission of oil to cylinder 36 is stopped and table 30 drops until the flanks 39a of the appropriate teeth 39 bear on corresponding blocks 45. The reading can then be effected in the manner first described, altering the figure indicated by display 18 by the constant corresponding to the level of table 30.

In order to return table 30 to lower levels, oil under pressure is first caused to enter cylinder 36 in such manner as to raise table 30 slightly and thereby partially disengage teeth 39 from the blocks 45. Then, lever 46 is turned by hand in a counterclockwise direction, completely freeing elements 45 from teeth 39. The entry of oil under pressure into cylinder 36 is then stopped. Table 30, now being deprived of hydraulic support, falls under its own weight and causes the oil to flow back into a suitable reservoir contained in supply system 21.

The descent of table 30 can be stopped at the desired level by releasing lever 46. For this purpose, spring 47 urges ring 43 and arms 44 in a clockwise direction to move block elements 45 into engagement with teeth 39 at the desired level. The descent of table 30 takes place at a suitable reduced speed, to which end the oil leaves cylinder 36 via a valve of suitable dimensions (not shown).

Having thus described in detail a preferred apparatus which embodies the concepts and principles of the invention and which accomplishes the various objects, purposes and aims thereof, it is to be appreciated and will be apparent to those skilled in the art, that many physical changes could be made in the apparatus without altering the inventive concepts and principles embodied therein. For example, springs 50 could be replaced by an adjustable screw fixed to plate 31 and connected to a shoe member slidable in a vertical guide integral with bed 11. The means for locating the table at different levels could be different from those described. The machine may further be adapted to various uses, by replacing probe 22 for making dimensional checks by a dial gauge or by a drawing or engraving point, or tools for drilling small holes or centers. Hence, it is intended that the scope of the invention be limited only to the extent indicated in the appended claims.

I claim:

1. A machine for conducting precision measuring operations on an article, said machine comprising:
   a frame,
   an article-contacting sensor element carried by the frame, said element being reciprocably movable relative to the frame along a substantially rectilinear path of travel,
   a worktable having a generally planar article support surface, said support surface being disposed generally perpendicular to said path and facing said element,
   a plurality of elongated pillars fixed to the worktable in parallelism with said path,
   a plurality of guide channels in the frame, each one of said pillars being slidably received within a corresponding one of said channels,
   a piston and cylinder assembly coupled with said worktable and disposed for rectilinear extension and contraction for moving said worktable in general parallelism with said path,
   a number of teeth on each of said pillars longitudinally spaced therealong, and
   a spider including a ring rotatable about said assembly and an elongated arm for each pillar, each arm extending radially outwardly from the ring and including an outer block element positioned for engaging a tooth on the corresponding pillar upon rotating the spider.

2. A machine as set forth in claim 1 wherein said pillars are equidistant from the assembly, said arms being substantially of the same length.

3. A measuring machine comprising a frame, a worktable mounted on said frame and having a planar support surface for a workpiece, a carriage rectilinearly slidable along a first coordinate direction, an outwardly projecting structure on said carriage, an outer member rectilinearly movable on said structure along a second coordinate direction perpendicular to said first direction, both said directions being parallel to said surface, and a sensor element overhanging said worktable and reciprocably movable on said outer member along a rectilinear path perpendicular to said surface, within a predetermined range of measurement, wherein the improvement comprises:
   guide means for guiding said worktable in a direction parallel to said path,
   means for moving said worktable along said guide means,
   a pillar associated with said guide means and parallel thereto,
   a number of equidistant stop means located on said pillar, and
   locking means for locking said worktable on a selected one of said stop means to bring the part of said workpiece to be measured within the range of movement of said sensor element on said path.

4. A machine as set forth in claim 3, comprising a plurality of pillars fixed to said worktable, and a plurality of guide channels in said frame, each one of said pillars being slidably received within a corresponding one of said channels, and said stop means comprising teeth provided on at least one of said pillars and individually engageable by said locking means.

5. A machine as set forth in claim 4, wherein said moving means comprises a hydraulic cylinder secured to said frame and a piston operating in the cylinder and secured to said worktable, and said stop means includes a member manually shiftable into and out of engagement with said teeth, said shiftable member being adapted to arrestably engage a surface of a selected one of said teeth substantially parallel to said support surface.

6. A machine as set forth in claim 4, wherein said guide means comprises an abutment member on said worktable and a guide member parallel to said pillars and engageable by said abutment member, and spring means yieldably biasing said worktable to cause said abutment member to engage said guide member.

7. A machine as set forth in claim 20, comprising a plurality of pillars fixed to said worktable and a plurality of guide channels in said frame, each one of said pillars being slidably received within a corresponding one of said channels, said stop means comprising a number of teeth equally longitudinally spaced on each of said pillars, and said locking means comprising a plurality of bodily movable members associated with said pillars and manually shiftable into and out of engagement with the teeth of said pillars.

8. A machine as set forth in claim 7, wherein said moving means comprises a hydraulic cylinder secured to said frame and a piston operating in the cylinder and secured to said worktable, said guide channels being equidistant from said cylinder, and said bodily movable members being secured to a spider structure rotatably mounted on said frame coaxially with said cylinder.